United States Patent
Wu et al.

(10) Patent No.: US 10,827,154 B2
(45) Date of Patent: Nov. 3, 2020

(54) DISPLAY DEVICE WITH REAR LIGHT TRANSMITTING MODULE

(71) Applicant: AU OPTRONICS CORPORATION, Hsin-Chu (TW)

(72) Inventors: Jui-Sheng Wu, Hsin-Chu (TW); Tsai-Fen Wu, Hsin-Chu (TW); Ya-Chen Kao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/412,889

(22) Filed: May 15, 2019

(65) Prior Publication Data
US 2019/0356889 A1 Nov. 21, 2019

(30) Foreign Application Priority Data
May 15, 2018 (TW) .............. 107116489 A

(51) Int. Cl.
*H04N 9/31* (2006.01)
*G02B 27/09* (2006.01)
*F21V 8/00* (2006.01)

(52) U.S. Cl.
CPC ......... *H04N 9/3152* (2013.01); *G02B 6/0031* (2013.01); *G02B 27/0972* (2013.01)

(58) Field of Classification Search
CPC . H04N 9/3152; G02B 6/0031; G02B 27/0972
See application file for complete search history.

(56) References Cited

U.S. PATENT DOCUMENTS

| 5,600,455 | A | * | 2/1997 | Ishikawa | ............... F21V 5/02 349/57 |
| 8,233,033 | B2 | | 7/2012 | Aarts et al. | |
| 8,360,619 | B2 | * | 1/2013 | Weng | ............... G02B 3/0056 362/311.06 |
| 9,353,926 | B2 | * | 5/2016 | Chen | ............... G09F 13/00 |

(Continued)

FOREIGN PATENT DOCUMENTS

| CN | 105717706 | | 6/2016 | |
| CN | 108287438 | A * | 7/2018 | ....... G02F 1/133605 |

(Continued)

*Primary Examiner* — Michelle M Iacoletti
*Assistant Examiner* — Magda Cruz
(74) *Attorney, Agent, or Firm* — WPAT, PC

(57) ABSTRACT

A display device of the present invention includes a light source apparatus and a rear light transmitting module disposed opposite a first light emitting surface of the light source apparatus. The rear light transmitting module includes a first transmitting layer and a second transmitting layer. The first transmitting layer has a plurality of first prisms arranged side by side and respectively protruding toward the first light emitting surface. The second transmitting layer is overlapped with the first transmitting layer on one side thereof opposite the first light emitting surface, and has a plurality of second prisms arranged side by side and respectively protruding toward the first transmitting layer. A vertical projection range of the first prisms on the first light emitting surface is misaligned with a vertical projection range of the second prisms on the first light emitting surface.

14 Claims, 10 Drawing Sheets

(56) References Cited

U.S. PATENT DOCUMENTS

| | | | |
|---|---|---|---|
| 2006/0001966 A1* | 1/2006 | Ohishi | G02B 5/0278 359/460 |
| 2006/0222311 A1* | 10/2006 | Ohtake | G02B 6/0031 385/146 |
| 2008/0158475 A1* | 7/2008 | Miyashita | G02B 6/0031 349/62 |
| 2011/0058389 A1* | 3/2011 | Shiau | G02F 1/133605 362/607 |
| 2011/0316409 A1* | 12/2011 | Cho | G02B 6/0025 313/483 |
| 2012/0140520 A1* | 6/2012 | Jung | G02B 6/0083 362/609 |
| 2012/0182275 A1 | 7/2012 | Chen et al. | |
| 2012/0274873 A1 | 11/2012 | Lee | |
| 2015/0009449 A1* | 1/2015 | Ito | G02B 6/0038 349/58 |
| 2017/0115447 A1* | 4/2017 | Miyamoto | G02B 6/0053 |
| 2018/0101087 A1* | 4/2018 | Shinohara | G02B 6/0051 |

FOREIGN PATENT DOCUMENTS

| | | | |
|---|---|---|---|
| EP | 0807832 A2 * | 11/1997 | G03B 21/208 |
| TW | 200714939 | 4/2007 | |
| TW | 201229995 | 7/2012 | |
| TW | 201243439 | 11/2012 | |

* cited by examiner

DISPLAY DEVICE WITH REAR LIGHT TRANSMITTING MODULE

FIELD OF THE INVENTION

The present invention relates to a display device, and specifically, the present invention relates to a display device having ambient light compensation.

BACKGROUND OF THE INVENTION

When a display device is used, the matching between its brightness and ambient light is important so that damage to eyes from long-term use can be reduced. Some users compensate light deficiency by using a table lamp or other light sources, but there are still problems of uneven light compensation and glare, causing discomfort for users' eyes. In addition, there is research indicating that at a range of a viewing angles (such as a viewing angle of 40°), said eye discomfort can be effectively alleviated by providing a light compensation apparatus on a rear side of the display device.

Although in the prior art there has been technical solutions of providing a light compensation apparatus on a rear side of a display device, the light compensating effect is not as good as expected. FIG. 1 is a schematic diagram of prior art display device. As shown in FIG. 1, the horizontal axis shows the width and corresponds to the horizontal direction; the vertical axis shows the depth and corresponds to the direction facing the display device. The display device 10 is disposed at a position near a depth position of 60 cm, a wall 30 is disposed at a depth position of about 80 cm behind the display device, and a user is on the origin. A dotted line extending from the origin to the wall surface the border of the user's viewing angle $\theta_e$. FIG. 1 illustrates unilateral side of the user's field of view, and thus the display device 10 shown in FIG. 1 has only original width. As shown in FIG. 1, the display device 10 emits light backward to compensate for light. However, there is an significant distance between the position on the wall surface 30 where the light is reflected and the position on the wall where the field of view extends. That is to say, the light emitted backward for light compensation cannot cover the field of view, and thus the ambient lighting is still dimmer than needed. In addition, as shown in FIG. 1, the display device 10 compensates for lighting in two directions, namely light $C_L$ toward the −x direction and light $C_R$ toward the +x direction. However, with respect to FIG. 1, light $C_R$ does not actually compensate for lighting. In other words, the prior art display device is disadvantageous in light use efficiency. Therefore, the display device in the prior art still needs to be improved.

SUMMARY OF THE INVENTION

An objective of the present invention is to provide a display device, which can provide ambient light compensation.

The display device includes a light source apparatus, a rear light transmitting module disposed opposite a first light emitting surface of the light source apparatus, and a display panel. The rear light transmitting module includes a first transmitting layer and a second transmitting layer, where the first transmitting layer has a plurality of first prisms arranged side by side and respectively protruding and facing (protruding toward) the first light emitting surface from a surface between the first transmitting layer and the second transmitting layer. Two sides of the first prism respectively have a first gentle surface and a first steep surface arranged along an extension direction of the first prisms. The first steep surface is closer to upright than the first gentle surface relative to the first light emitting surface. The second transmitting layer is overlapped with the first light emitting surface on one side thereof opposite the first light emitting surface, and has a plurality of second prisms arranged side by side and respectively protruding toward the first transmitting layer. Two sides of the second prism respectively have a second gentle surface and a second steep surface arranged along an extension direction of the second prisms. The second steep surface is closer to upright than the second gentle surface relative to the first light emitting surface. The display panel is disposed on one side of the light source apparatus opposite the rear light transmitting module. The light source apparatus has a second light emitting surface opposite the first light emitting surface and facing the display panel, A vertical projection range of the first prisms on the first light emitting surface is misaligned with a vertical projection range of the second prisms on the first light emitting surface. In this way, an amount of light emitting toward a preset direction is increased, and a compensation light range is increased.

To make a further understanding of features and technical content of the present invention, refer to the following detailed descriptions and drawings relevant to the present invention. However, the drawings provided are only used to provide references and illustrations, and are not used to limit the present invention.

DETAILED DESCRIPTION OF THE PREFERRED EMBODIMENTS

The present invention provides a display device, and a rear light transmitting module on a rear side of the display device is used to improve a light compensation effect. Preferably, the display device of the present invention is a liquid crystal display having a backlight module. However, in different embodiments, the display device may also be another type of a non-self-luminous display device or a self-luminous display device.

Figure 1:
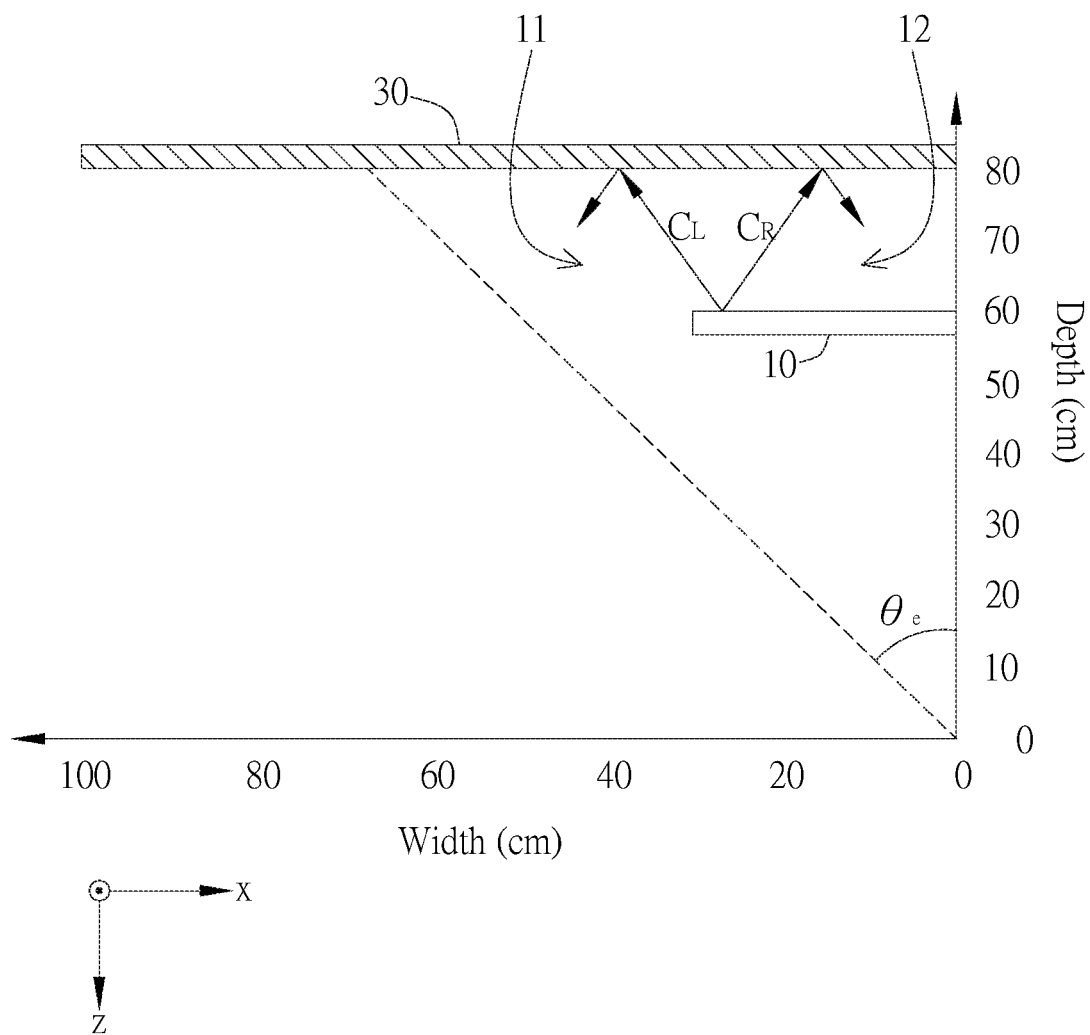
FIG. 1 is a schematic diagram of light emitting of a known display device.
Figure 2:
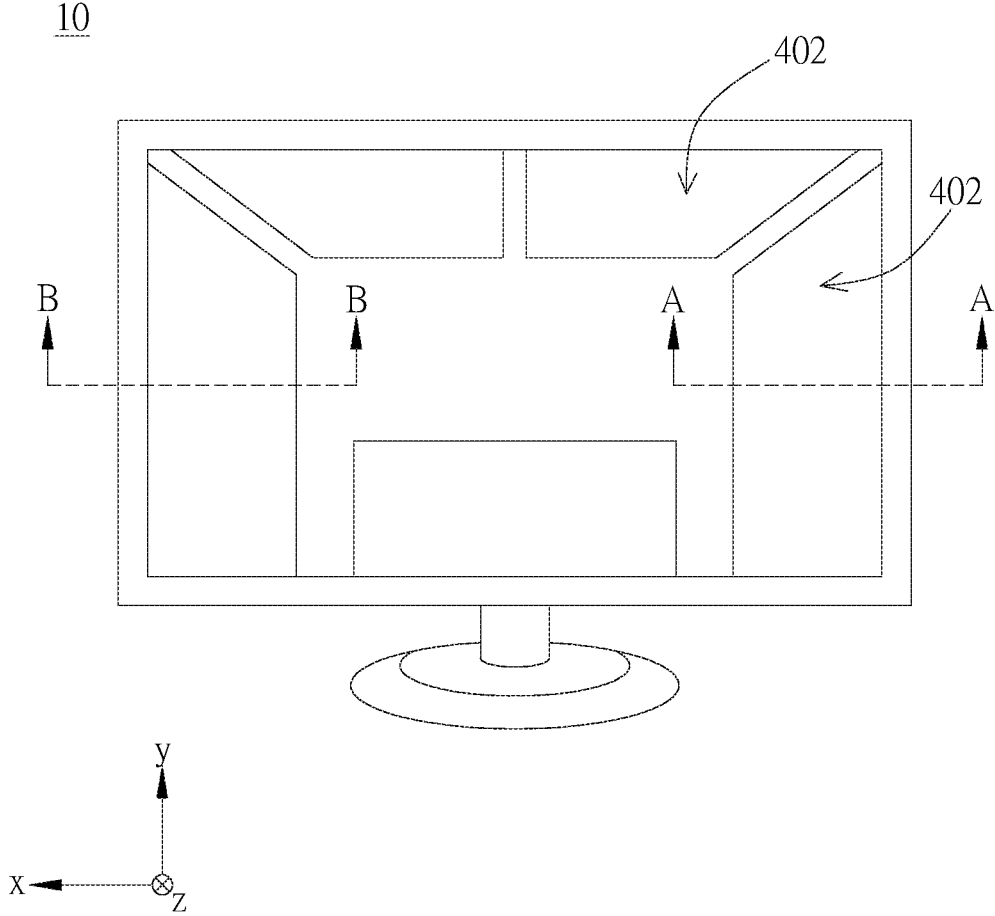
FIG. 2 is a schematic diagram of a rear view of an embodiment of the display device according to the present invention.
Figure 2A:
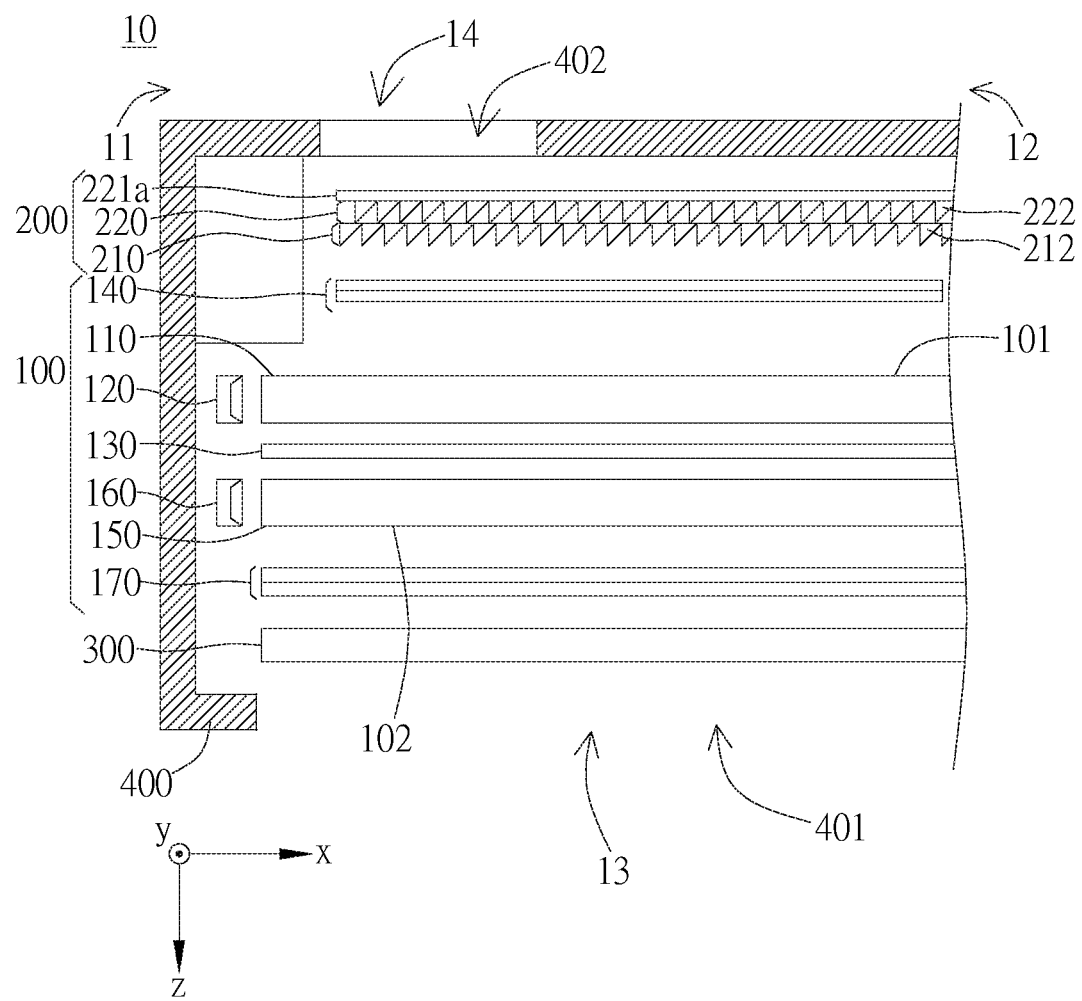
FIG. 2A is a sectional view of an embodiment of the display device according to the present invention.

Referring to FIG. 2 and FIG. 2A, FIG. 2 is a schematic diagram of a rear side of an embodiment of a display device according to the present invention; and FIG. 2A is a sectional view of an AA line position in FIG. 2. As shown in FIG. 2A, the display device 10 has a display side 13 and a rear side 14. The display device 10 includes a light source apparatus 100 disposed near the rear side 14 and a rear light transmitting module 200. The light source apparatus 100 has a first light emitting surface 101. As shown in FIG. 2A, the light source apparatus 100 includes a first light guide plate 110, a light source 120, a reflector plate 130, and an optical film component 140. For example, the optical film component 140 may be a group formed by a diffusion sheet and a brightening sheet, and may be adjusted or even omitted regarding an optical design. In this embodiment, the first light emitting surface 101 preferably refers to a surface of the first light guide plate 110 facing the rear side 14.

The rear light transmitting module 200 is disposed opposite the first light emitting surface 101 of the light source apparatus 100. As shown in FIG. 2A, the rear light transmitting module 200 includes a first transmitting layer 210 and a second transmitting layer 220. The first transmitting layer 210 has a plurality of first prisms 212 arranged side by side, each first prism 212 has a first prism extension direction extending along a y direction in FIG. 2A, and a space between the first prisms 212 is an air layer. One side of the first prism 212 back to the second transmitting layer 220 has a protruded corner angle, and each first prism 212 protrudes toward the first light emitting surface 101. For example, the corner angle of the first prism 212 faces the first light emitting surface.

In addition, the second transmitting layer 220 is overlapped with the first transmitting layer 210 on one side thereof opposite the first light emitting surface 101. The second transmitting layer 220 has a plurality of second prisms 222 arranged side by side. Each second prism 222 has a second prism extension direction extending along a y direction in FIG. 2A, and a space between the second prisms 222 is an air layer. The second prism 222 is disposed on a base material 221a, and one side of the second prism 222 back to the base material 221a has a protruded corner angle. Each second prism 222 protrudes toward the first transmitting layer 210 from the base material 221a. By means of the foregoing design, a light pattern distribution of light emitted by the light source 120 may be changed by the first light guide plate 110 and the optical film component 140, and then ambient light is provided on the rear side 14 by the rear light transmitting module 200.

In this embodiment, the display device 10 further includes a housing 400 and a display panel 300 disposed on one side of the light source apparatus 100 opposite the rear light transmitting module 200. That is, the display panel 300 is disposed closer to the display side 13. The light source apparatus 100 has a second light emitting surface 102 back to the first light emitting surface 101, and the second light emitting surface 102 faces the display panel 300. As shown in FIG. 2A, the display device 10 further includes a second light guide plate 150, a light source 160, and an optical film component 170. The second light emitting surface 102 refers to a surface of the second light guide plate 150 facing the optical film component 170. The second light emitting surface 102 and the first light emitting surface 101 face toward opposite sides. A light pattern distribution of light emitted by the light source 160 may be changed by the second light guide plate 150 and the optical film component 170, to provide light required for displaying. In this embodiment, the light source apparatus 100 provides, by using different light sources and light guide plates, backlight and rear-side compensation light required by the display panel 300 respectively. However, in different embodiments, only a single group of light sources and light guide plates may also be used to provide backlight and rear-side compensation light required by the display panel 300.

As shown in FIG. 2A, the display panel 300, the light source apparatus 100, and the rear light transmitting module 200 are all accommodated in the housing 400. The housing 400 has a display window 401 and a light inlet window 402 disposed at opposite sides thereof, and more specifically, respectively located on the display side 13 and the rear side 14. The display window 401 corresponds to the display panel 300, and the light inlet window 402 corresponds to the rear light transmitting module 200. In other words, the display panel 300 is disposed closer to the display window 401 than the rear light transmitting module 200, and the rear light transmitting module 200 is closer to the light inlet window 402 than the display panel 300. The light inlet window 402 may be formed in a hollowed-out manner or may be covered by a transparent cover plate. It should be added that, an outline of the light inlet window 402 drawn in FIG. 2 forms a rectangular or trapezoidal shape, but actual shapes are not limited thereto.

Figure 2B:
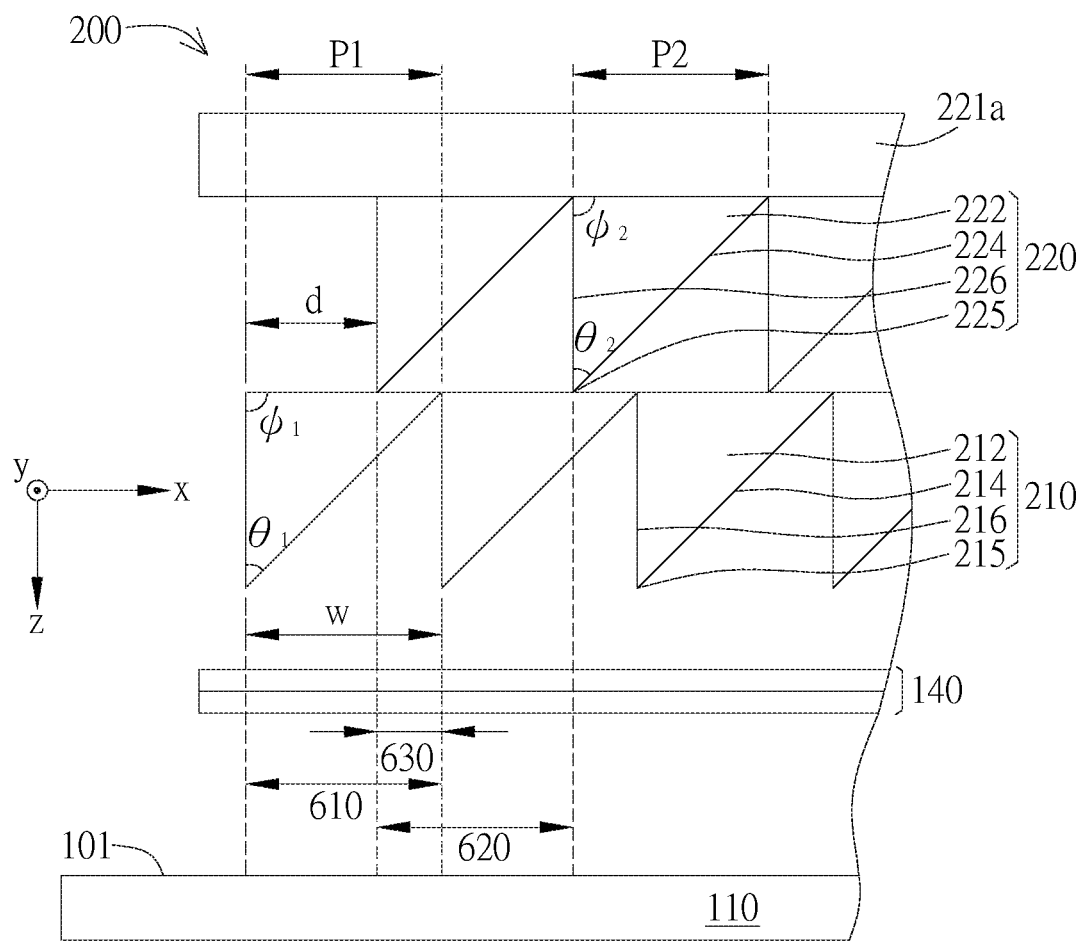
FIG. 2B is an enlarged sectional view of an embodiment of a rear light transmitting module.

FIG. 2B is an enlarged sectional view of an embodiment of the rear light transmitting module 200. As shown in FIG. 2B, two sides of the first prism 212 respectively have a first gentle surface 214 and a first steep surface 216 arranged along a first prism extension direction y. The first steep surface 216 is closer to upright than the first gentle surface 214 relative to the first light emitting surface 101. The first gentle surface 214 forms a slope, and the first gentle surface 214 in each first prism 212 is disposed on one side closer to a +x direction (that is, the second side 12 in FIG. 2A) than the first steep surface 216, and in a top-right bottom-left inclination direction. The first gentle surface 214 intersects the first steep surface 216 to form a first ridge 215, and the intersection protrudes toward the first light emitting surface 101.

Similarly, two sides of the second prism 222 respectively have a second gentle surface 224 and a second steep surface 226 arranged along a second prism extension direction. The second steep surface 226 is closer to upright than the second gentle surface 224 relative to the first light emitting surface 101. The second gentle surface 224 forms a slope, and the second gentle surface 224 in each second prism 222 is disposed on one side closer to a +x direction (that is, the second side 12 in FIG. 2A) than the second steep surface 226, and in a top-right bottom-left inclination direction. The second gentle surface 224 intersects the second steep surface 226 to form a second ridge 225, and the intersection protrudes toward the first transmitting layer 210.

As shown in FIG. 2B, a vertical projection range of the first prisms 212 on the first light emitting surface 101 is misaligned with a vertical projection range of the second prisms 222 on the first light emitting surface 101. For example, a projection of the first ridge 215 of the first prism 212 is misaligned with a projection of the second ridge 225 of the second prism 222 in a z direction. Specifically, a gap d is provided between a vertical projection of the first ridge 215 on the first light emitting surface 101 and a vertical projection of the second ridge 225 on the first light emitting surface 101. In other words, the first prism 212 and the second prism 222 use the gap d as an offset. The gap d is less than a cross-sectional width w of the first prism 212. In this embodiment, the gap d ranges from 40% to 60% of the cross-sectional width w of the first prism 212. By using a disposing manner of shifting the first prism 212 and the second prism 222 to form a misalignment, a compensation light range may be increased. For example, light emitting to the first side 11 in FIG. 2A is guided to a position more on the outer side (far from the display device).

Figure 2C:
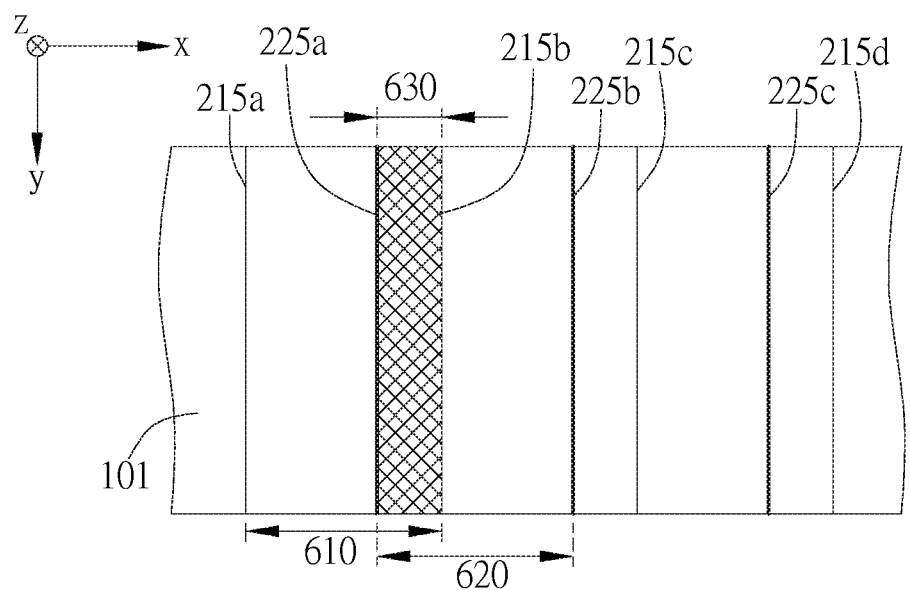
FIG. 2C is a schematic projection diagram of a first ridge and a second ridge on a first light emitting surface.

Referring to FIG. 2B and FIG. 2C, FIG. 2C is a schematic projection diagram of the first ridge 215 and the second ridge 225 on the first light emitting surface 101. As shown in FIG. 2C, seen from a downward angle of the first light emitting surface 101, a vertical projection of the first ridge 215 on the first light emitting surface 101 and a vertical projection of the second ridge 225 on the first light emitting surface 101 are disposed at intervals side by side. Specifically, the first ridge has a projection position (215a, 215b, 215c, 215d) on the first light emitting surface 101, and the second ridge has a projection position (225a, 225b, 225c) on the first light emitting surface 101. The projection position (215a, 215b, 215c, 215d) of the first ridge and the projection position (225a, 225b, 225c) of the second ridge are disposed at intervals side by side, and do not overlap with each other.

In addition, as shown in FIG. 2B and FIG. 2C, the first gentle surface 214 has a first vertical projection range 610 on the first light emitting surface 101, and the second gentle surface 224 has a second vertical projection range 620 on the first light emitting surface 101. The first vertical projection range 610 and the second vertical projection range 620 have an overlapping region 630. An area of the overlapping region 630 (as shown by grids) ranges from 40% to 60% of an area of the first vertical projection range 610. For example, when the gap d between the first prism 212 and the second prism 222 is 40% of the cross-sectional width w of the first prism 212, the area of the overlapping region 630 is 60% of the area of the first vertical projection range 610.

Back to FIG. 2B, a first pitch P1 is provided between every two adjacent first prisms 212, and a second pitch P2 is provided between every two adjacent second prisms 222. The pitch refers to a distance from a position on a prism to a same position on an adjacent prism, for example, a distance from a first ridge 215 to a first ridge 215 of an adjacent first prism 212. In the embodiment of FIG. 2B, each first prism 212 is close to each other, and each second prism 222 is close to each other, where the first pitch P1 is equal to the second pitch P2. In other embodiments, a ratio of the first pitch P1 to the second pitch P2 ranges from 1/20 to 20. For example, a disposed distance between the first prisms 212 may be increased to increase the pitch ratio. On the contrary, a disposed distance between the second prisms 222 may be decreased to decrease the pitch ratio. A pitch proportion may match the offset change to adjust a light emitting effect. In an embodiment, the first pitch P1 and the second pitch P2 range from 10 μm to 200 μm.

In addition, as shown in FIG. 2B, the first steep surface 216 of the first prism 212 and the other two connected surfaces respectively have an inner angle θ1 and an inner angle ψ1. The second steep surface 226 of the second prism 222 and the other two connected surfaces respectively have an inner angle θ2 and an inner angle ψ2. In an embodiment, the inner angle ψ1 and the inner angle ψ2 are preferably right angles, and the inner angle θ1 and the inner angle θ2 are preferably 45 degrees, but this is not limited. Specifically, an included angle between the first steep surface 216 (or the second steep surface 226) and the first light emitting surface 101 ranges from 85 degrees to 95 degrees. In other words, the inner angle ψ1 (or the inner angle ψ2) ranges from 85 degrees to 95 degrees. In another aspect, an included angle between the first gentle surface 214 (or the second gentle surface 224) and the first light emitting surface 101 ranges from 30 degrees to 60 degrees. In other words, the inner angle ψ1 (or the inner angle ψ2) ranges from 30 degrees to 60 degrees. By changing a size of the inner angle of the prism, a light path of entering the prism from the first steep surface 214 (or the second steep surface 224), and a light path of entering the prism from the first gentle surface 216 (or the second gentle surface 226) may be adjusted, to improve light utilization.

Figure 3:
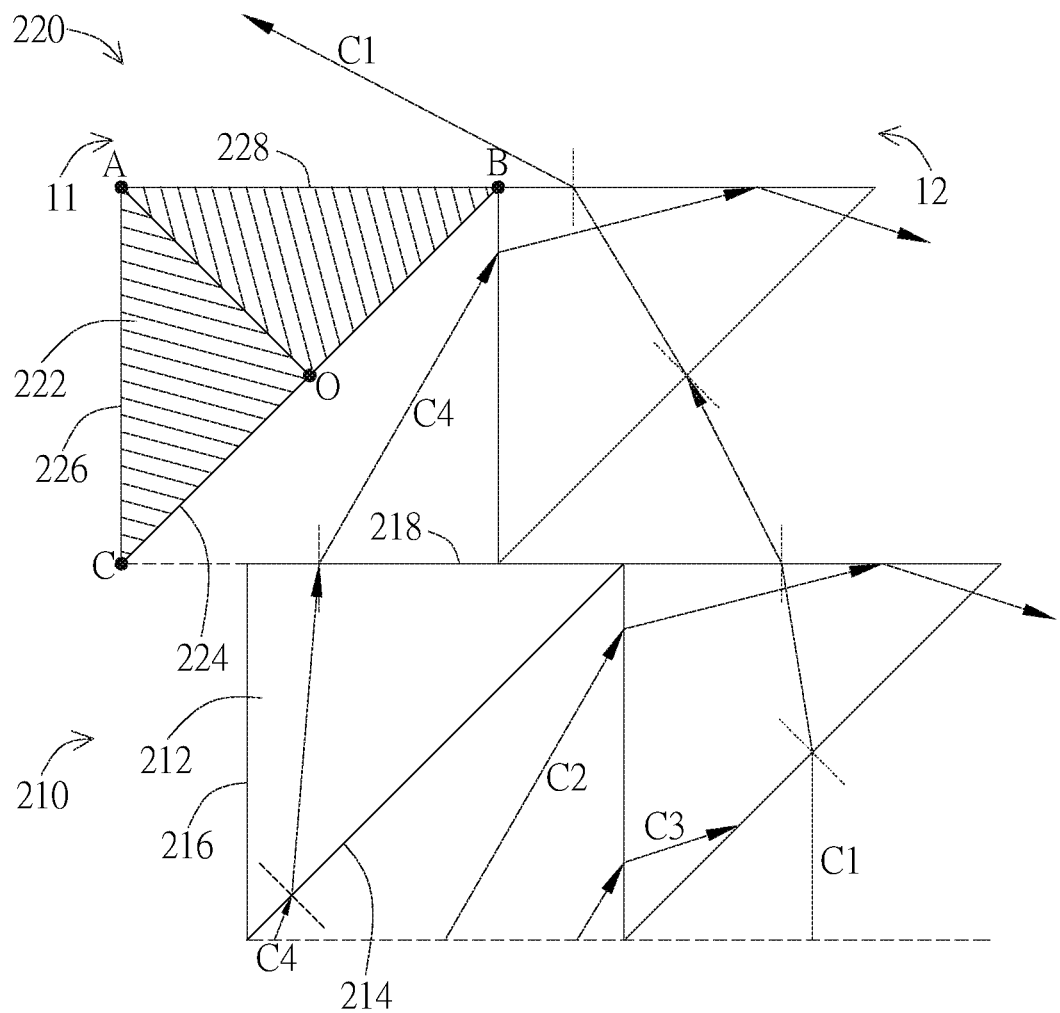
FIG. 3 is a schematic diagram of light penetrating a first prism and a second prism.

FIG. 3 is a schematic diagram of light penetrating the first prism 212 and the second prism 222. As shown in FIG. 3, light C1, light C2, light C3, and light C4 from the first light emitting surface enter the first transmitting layer 210. The first prism 212 has a first gentle surface 214, a first steep surface 216, and a first adjacent surface 218 that intersect each other. The light C1 and the light C4 enter the first prism 212 from the first gentle surface 214, and the light C2 and the light C3 enter the first prism 212 from the first steep surface 216. As shown in FIG. 3, the light C1 is emitted from the first adjacent surface 218 via the first gentle surface 214, and an extent of deflecting to the first side 11 is increased. After being emitted from the first adjacent surface 218, the light C4 is deflected to the second side 12. In another aspect, the first steep surface 216 enables the light entering from the first steep surface 216 to have a relatively large incident angle, and therefore, a relatively large deflection is generated. For example, the light C2 from the first adjacent surface 218 via the first steep surface 216 is totally reflected. The light C3 leaves the first prism 212 from the first gentle surface 214 via the first steep surface 216. Some light (such as the light C2 and the light C3) from the first light emitting surface may be recycled inside the display device for reuse (for example, recycled by the reflector plate in FIG. 2A), so that the recycled light can enter from the first gentle surface 214 and be emitted deflected to the first side 11. By disposing the first steep surface 216 and the first gentle surface 214, the light can be emitted to a same side.

As shown in FIG. 3, the light C1 and the light C4 enter the second transmitting layer 220. The second prism 222 has a second gentle surface 224, a second steep surface 226, and a second adjacent surface 228 that intersect each other. The light C1 enters the second prism 222 from the second gentle surface 224, and the light C4 enters the second prism 222 from the second steep surface 226. As shown in FIG. 3, the light C1 is emitted from the second adjacent surface 228 via the second gentle surface 224, and the extent of deflecting to the first side 11 is more increased. In another aspect, the second steep surface 226 enables the light entering from the second steep surface 226 to have a relatively large incident angle, and therefore, a relatively large deflection is generated. For example, the light C4 from the second adjacent surface 228 via the second steep surface 226 is totally reflected. Some light (such as the light C4) from the first light emitting surface may be recycled inside the display device for reuse, so that the recycled light can enter from the second gentle surface 224 and be emitted deflected to the first side 11. By disposing the second steep surface 226 and the second gentle surface 224, the light can be emitted to a same side.

On the whole, by disposing the first transmitting layer 210 and the second transmitting layer 220, an emergent angle of light toward a preset direction (such as the first side) is increased as the light penetrating different transmitting layers, to increase a compensation light range. Light not toward the preset direction is recycled by using an upright surface design, to improve light utilization.

In addition, referring to FIG. 3, the first prism 212 and the second prism 222 have a triangular cross section. By using the second prism 222 as an example, a central point O is selected on a BC edge on which the second gentle surface 224 resides, and a segment AO divides the triangle into an upper half region and a lower half region, where a triangle AOB is the upper half region, and a triangle AOC is the lower half region. Referring to FIG. 3, the light C1 enters the upper half region of the second prism 222 after penetrating the first prism 212, and is refracted in the second prism 222 twice and then emitted from the second adjacent surface 228. In other words, when an amount of light entering the upper half region of the second prism 222 is increased, an amount of light emitting toward a preset direction (such as the first side) in a preset angle may be increased accordingly. The preset angle herein refers to an emergent angle that may increase a compensation light range.

The first prism 212 and the second prism 222 being disposed misaligned as shown in FIG. 2B and FIG. 3 can achieve the foregoing objective. For example, the light is slightly deflected toward a preset direction (such as the first side 11) after penetrating the first transmitting layer 210. When the first prism 212 and the second prism 222 are disposed misaligned, an amount of light reaching the upper half region of the second prism 222 may be increased, to increase an amount of light emitting toward the preset direction (such as the first side 11) in the preset angle. In other embodiments, the pitch may be adjusted to increase the amount of the light reaching the upper half region of the second prism 222.

Referring to FIG. 2A, FIG. 2B, and FIG. 3, in addition to using prisms with the misalignment design and different inclination degrees, a light emitting angle may also be adjusted based on a refractive index difference. In an embodiment, a refractive index of the first prism 212 is greater than or equal to a refractive index of the second prism 222. The refractive index of the second prism 222 is greater than or equal to a refractive index of the base material 221a. In addition, based on the foregoing refractive index relationship, at least one of the first prism 212, the second prism 222, and the base material 221a has a different refractive index. For example, the refractive index of the base material 221a is smaller. In other words, a refractive index of a component closer to the rear side 14 preferably has a smaller refractive index so that an emergent angle of light toward a same side is increased. In addition, based on the foregoing refractive index relationship, in other examples, refractive indexes of the first prism 212, the second prism 222, and the base material 221a are different to improve the effect of increasing the emergent angle of the light toward the same side.

Figure 4:
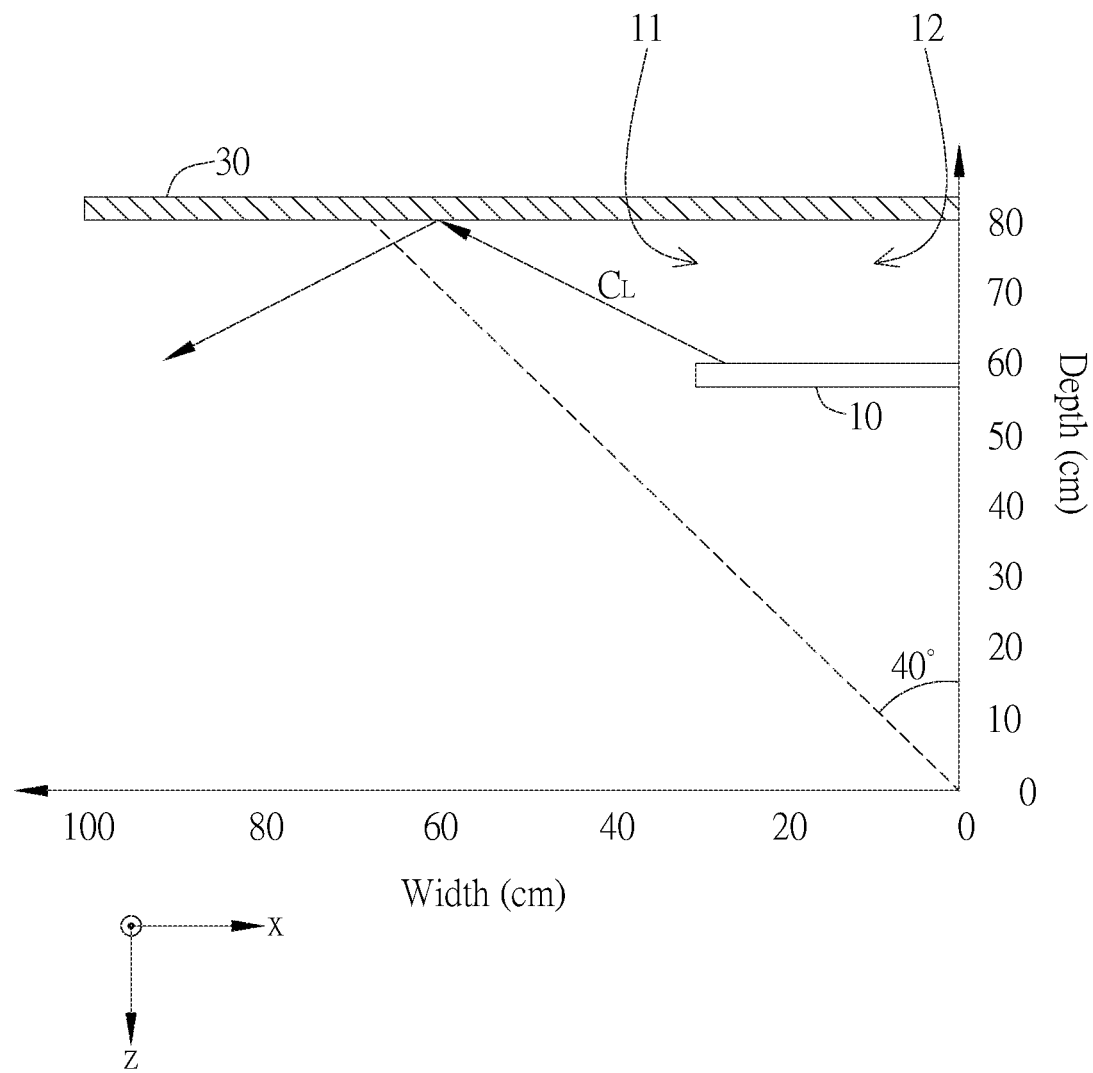
FIG. 4 is a schematic diagram of light emitting of the display device according to the present invention.

FIG. 4 is a schematic diagram of light emitting of the display device 10 according to the present invention. As shown in FIG. 4, the display device 10 of the present invention is used to compensate light to the rear side of the display device 10, light CL has an emergent angle of about 50 degrees to 60 degrees, for example, an emergent angle of 57 degrees in this embodiment, so that a reflection position on a wall surface 30 is close to a position of a user viewing angle of 40 degrees on the wall surface 30. In this way, the compensation light range is increased, and an entire ambient lighting feeling in a range of the viewing angle of 40 degrees is improved. In addition, as shown in FIG. 4, the display device 10 has a main light emitting direction at a same light emitting position, for example, the light CL is emitted toward the first side 11 (-x direction), and emitted toward the same side by guiding the light, to improve light utilization.

Figure 5:
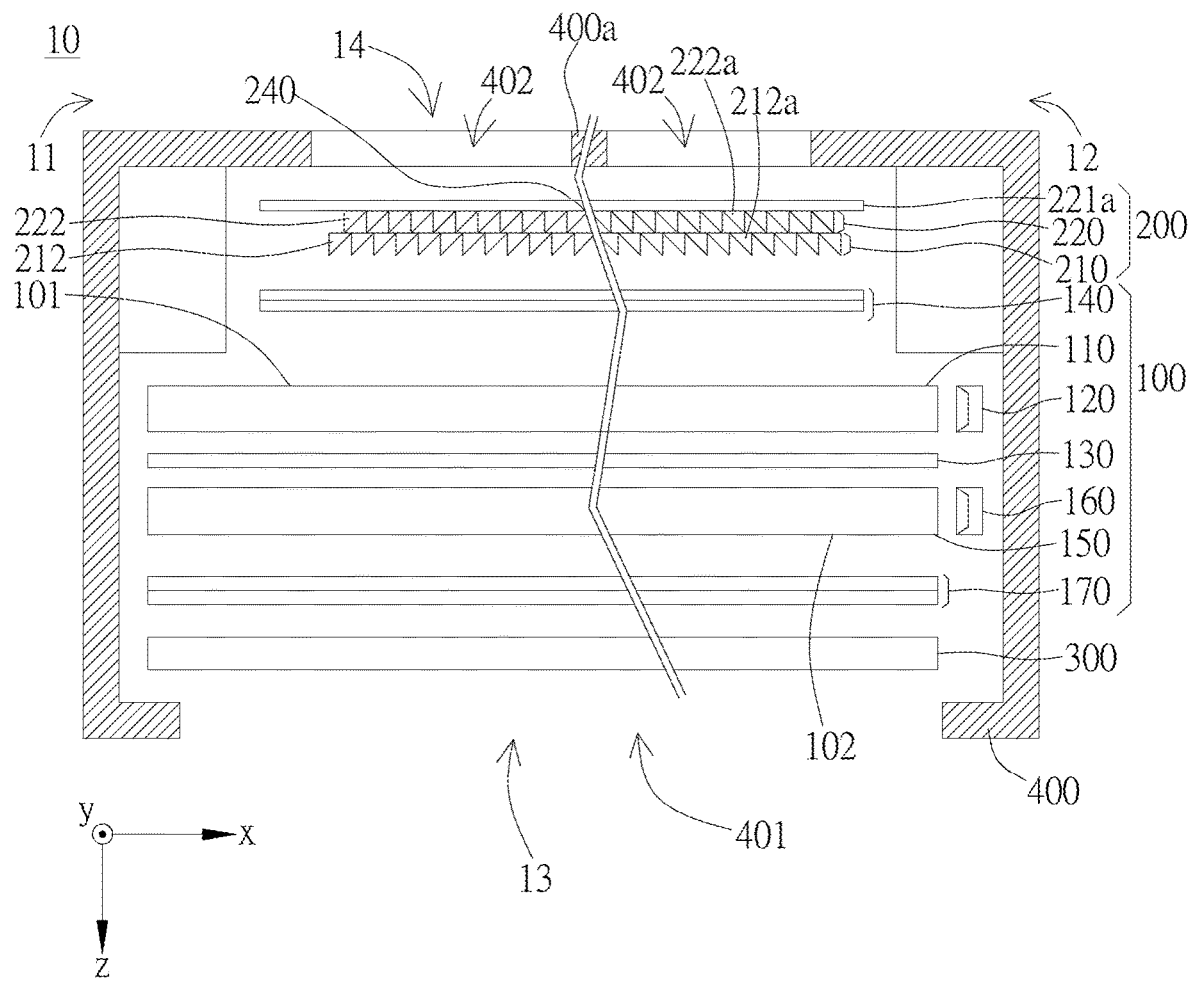
FIG. 5 is a sectional view of another embodiment of the display device.

FIG. 5 is a sectional view of another embodiment of the display device 10. In FIG. 5, a sectional view corresponding to an AA line position and a BB line position in FIG. 2 is rendered. A part close to the first side 11 corresponds to the AA line position, and a part close to the second side 12 corresponds to the BB line position. As shown in FIG. 5, the rear light transmitting module 200 has a first prism 212 and a second prism 222 in different inclination directions. Specifically, the first transmitting layer 210 has a plurality of first prisms 212 arranged side by side, each first prism 212 has a first prism extension direction extending along a y direction in FIG. 5, and each first prism 212 protrudes toward the first light emitting surface 101, that is, protrudes from a surface between the first transmitting layer 210 and the second transmitting layer 220 and faces the first light emitting surface 101. In the first transmitting layer 210, a slope of the first prism 212 close to the first side 11 is set to a top-right bottom-left inclination direction; on the contrary, a slope of a first prism 212a close to the second side 12 is set to a top-left bottom-right inclination direction.

In another aspect, the second transmitting layer 220 is overlapped with the first transmitting layer 210 on one side thereof opposite the first light emitting surface 101. The second transmitting layer 220 has a plurality of second prisms 222 arranged side by side. Each second prism 222 has a second prism extension direction extending along a y direction in FIG. 5, and each second prism 222 protrudes toward the first transmitting layer 210 from the base material 221a. In the second transmitting layer 220, a slope of the second prism 222 close to the first side 11 is set to a top-right bottom-left inclination direction; on the contrary, a slope of a second prism 222a close to the second side 12 is set to a top-left bottom-right inclination direction.

In addition, the rear light transmitting module 200 has a transformation region 240, corresponding to the first prism 212 and the second prism 222 to change a position of a slope inclination direction. The housing 400 has a light inlet window 402 opposite the rear light transmitting module 200. As shown in FIG. 5, one side close to the first side 11 and one side close to the second side 12 are each provided with a light inlet window 402. A prism having a same slope inclination direction as those of the first prism 212 and the second prism 222 may guide light from the light inlet window 402 close to the first side 11 to a position beyond the first side 11. A prism having a same slope inclination direction as those of the first prism 212a and the second prism 222a may guide light from the light inlet window 402 close to the second side 12 to a position beyond the second side 12. For example, a housing 400a may be formed at a position opposite the transformation region 240, that is, the light inlet window 402 close to the first side 11 and the light inlet window 402 close to the second side 12 are separated by the housing 400a. A width of the housing 400a along an x direction may be adjusted based on a lighting effect of compensation light. For example, the width of the housing 400a may be slightly greater than a range of the transformation region 240. By means of the design, the first prism 212 and the second prism 222 close to the first side 11 jointly guide the light to the position beyond the first side 11 (far from the display device), and the first prism 212a and the second prism 222a close to the second side 12 jointly guide the light to the position beyond the second side 12, so that the compensation light range of two sides of the rear side of the display device 10 is increased, to improve the entire ambient lighting feeling.

Figure 6:
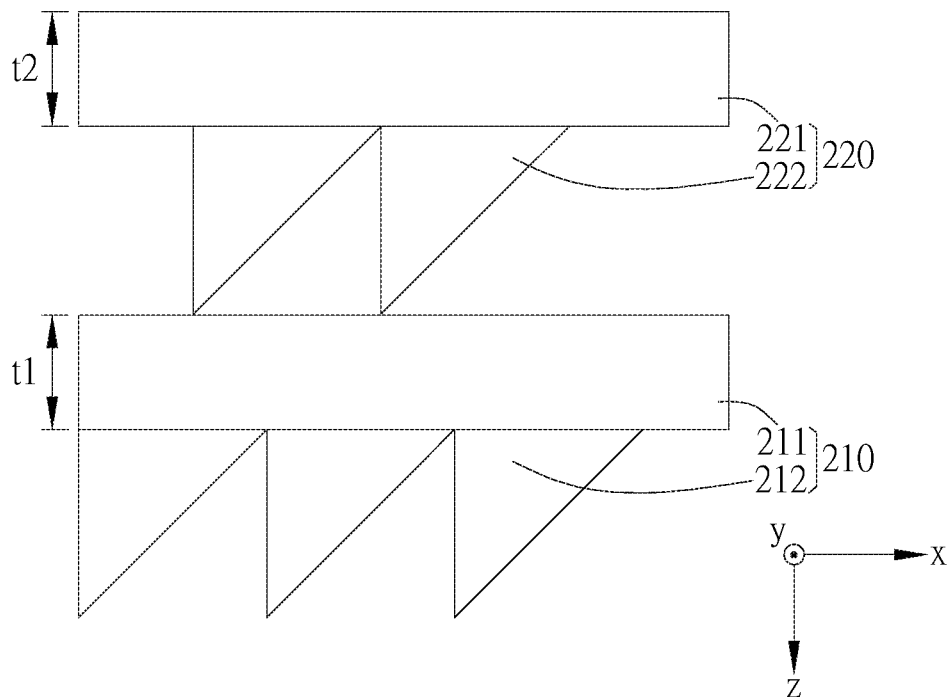
FIG. 6 and FIG. 7 are schematic diagrams of different embodiments of the rear light transmitting module.
Figure 7:
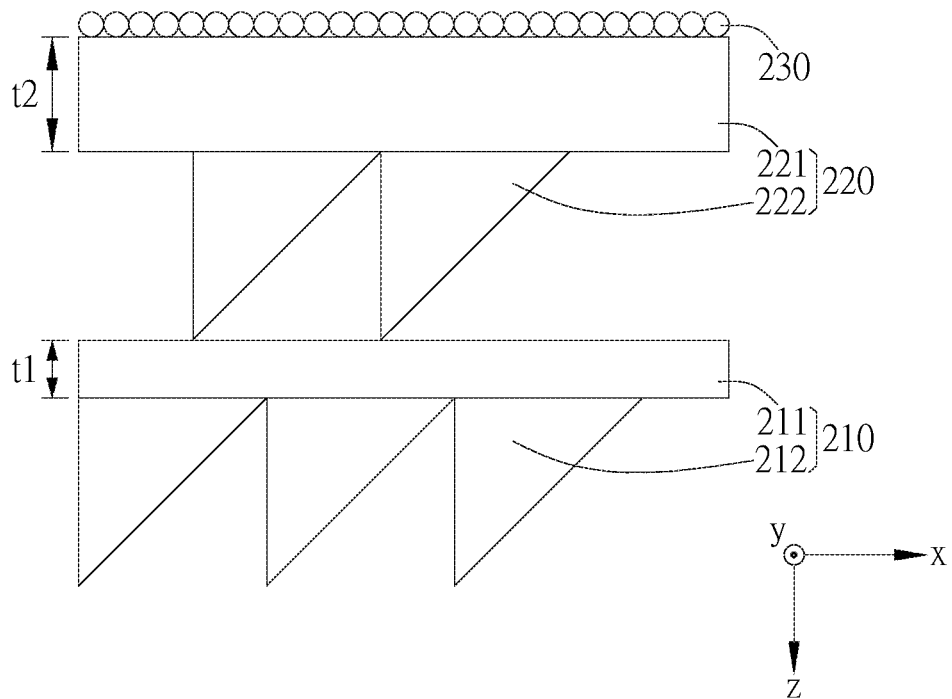

FIG. 6 and FIG. 7 are schematic diagrams of different embodiments of the rear light transmitting module 200. As shown in FIG. 6, the first transmitting layer 210 has a first base material 211, and the first prisms 212 respectively protrude toward the first light emitting surface from the first base material 211. The second transmitting layer 220 has a second base material 221, and the second prisms 222 respectively protrude toward the first light emitting surface from the second base material 221. Different from the foregoing embodiment, a first base material 211 is added between the first prism 212 and the second prism 222 so that the second transmitting layer 220 can be more easily overlapped with the first transmitting layer 210 such that the production efficiency is increased. In an embodiment, a thickness t1 of the first base material 211 is equal to a thickness t2 of the second base material 221, where the thickness t2 ranges from 25 μm to 200 μm, and the thickness t1 ranges from 5 μm to 200 μm. In a preferred embodiment, the thickness t1 of the first base material 211 is less than the thickness t2 of the second base material 221, so that the entire thickness of the rear light transmitting module 200 is smaller.

In addition, a refractive index of the first prism 212 is preferably greater than or equal to a refractive index of the second prism 222, and the first base material 211 and the second base material 221 have a same refractive index. In the first transmitting layer 210, the refractive index of the first prism 212 is greater than or equal to the refractive index of the first base material 211. In the second transmitting layer 220, the refractive index of the second prism 222 is greater than or equal to the refractive index of the second base material 221. Regarding different transmitting layers, the refractive index of the first base material 211 is less than or equal to the refractive index of the second prism 222. In addition, based on the foregoing refractive index relationship, at least one of the first prism 212, the first base material 211, the second prism 222, and the second base material 221 has a different refractive index. For example, the refractive index of the second base material 221 is smaller. In this way, in various transmitting layers, light may enter a medium (base material) with a small refractive index from a medium (prism) with a large refractive index, so that an emergent angle of the light toward the same side is increased. In addition, based on the foregoing refractive index relationship, in other examples, refractive indexes of the first prism 212, the first base material 211, the second prism 222, and the second base material 221 are different, to improve the effect of increasing the emergent angle of the light to the same side.

In another embodiment shown in FIG. 7, the first transmitting layer 210 has a first base material 211, and the first prisms 212 respectively protrude toward the first light emitting surface from the first base material 211. The second transmitting layer 220 has a second base material 221, and the second prisms 222 respectively protrude toward the first light emitting surface from the second base material 221. In this embodiment, the first base material 211 and the second base material 221 have a different thickness, and the thickness t1 of the first base material 211 is less than the thickness t2 of the second base material 221. In addition, a surface of the second base material 221 opposite the second prism 222 is provided with a protective layer 230, to avoid scratching the second base material 221 in an assembly process.

Figure 8:
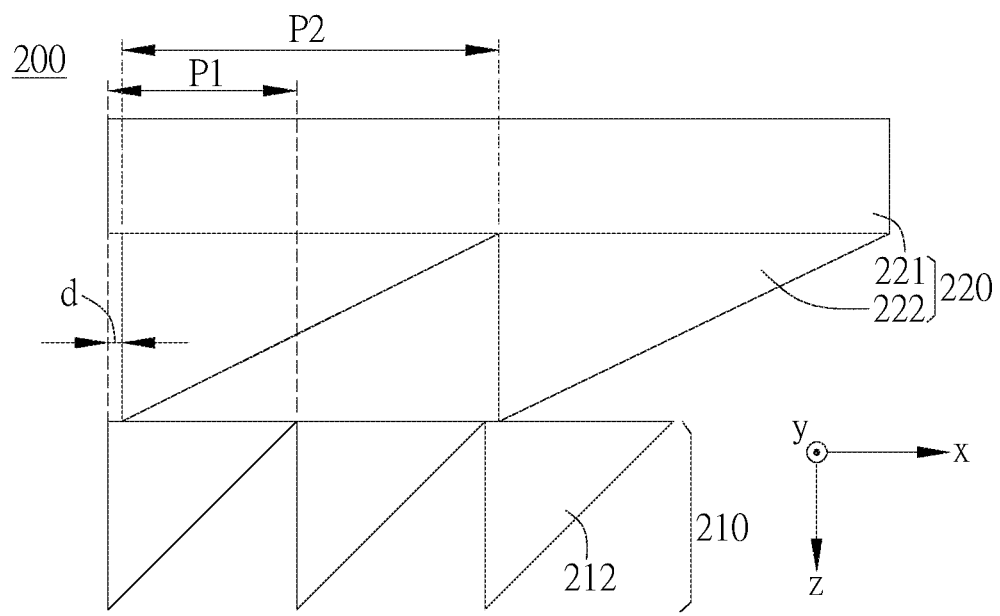
FIG. 8 is a schematic diagram of an embodiment of different misalignment manners of the rear light transmitting module.

FIG. 8 is a schematic diagram of an embodiment of different misalignment manners of the rear light transmitting module 200. As shown in FIG. 8, the first prism 212 is misaligned with the second prism 222. In addition, a first pitch P1 is provided between every two adjacent first prisms 212, and a second pitch P2 is provided between every two adjacent second prisms 222. A pitch proportion may match an offset change to adjust a light emitting effect. In this embodiment, offsets of the first prism 212 and the second prism 222 are reduced (for example, a proportion of the gap d less than 40% of the foregoing is used), and a misaligned disposing manner is formed. Each first prism 212 is close to another, and each second prism 222 adjusts sizes of two inner angles close to the gentle surface to form close disposing, where the first pitch P1 is less than the second pitch P2. By increasing a disposed distance between the second prisms 222, an amount of light reaching the upper half region of the second prism 222 after the light penetrates the first transmitting layer 210 may be increased, and after the light is emitted from the rear light transmitting module, an amount of the light emitting toward a preset direction in a preset angle may be increased.

Figure 9:
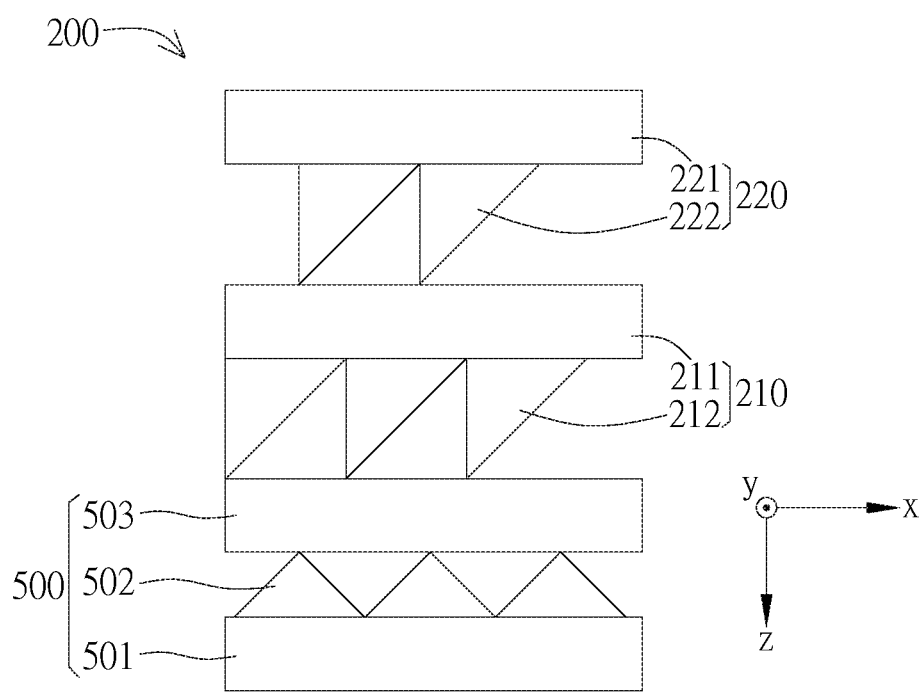
FIG. 9 is a schematic diagram of an embodiment of the rear light transmitting module in combination with a light collecting module.

FIG. 9 is a schematic diagram of an embodiment of the rear light transmitting module 200 in combination with a light collecting module 500. As shown in FIG. 9, different from the foregoing embodiment, in addition to the first transmitting layer 210 and the second transmitting layer 220, the display device further includes a light collecting module 500. The light collecting module 500 is disposed between the first light emitting surface and the first transmitting layer 210, that is, located on one side of the first transmitting layer 210 opposite the second transmitting layer 220. As shown in FIG. 9, the light collecting module 500 includes a plurality of light collecting prisms 502 disposed between a base material 501 and a base material 503. The light collecting prism 502 has a prism extension direction extending along a y direction in FIG. 9. Each light collecting prism 502 protrudes toward the first transmitting layer 210 from the base material 501. The light collecting module 500 may adjust a light pattern distribution of light emitting from the first light emitting surface, so that an emergent angle obtained after the light penetrates the light collecting module 500 is reduced (for example, approaching 0 degrees), to further improve a light control effect, increase an amount of light emitting toward a preset direction in a preset angle, and improve light utilization.

Figure 10:
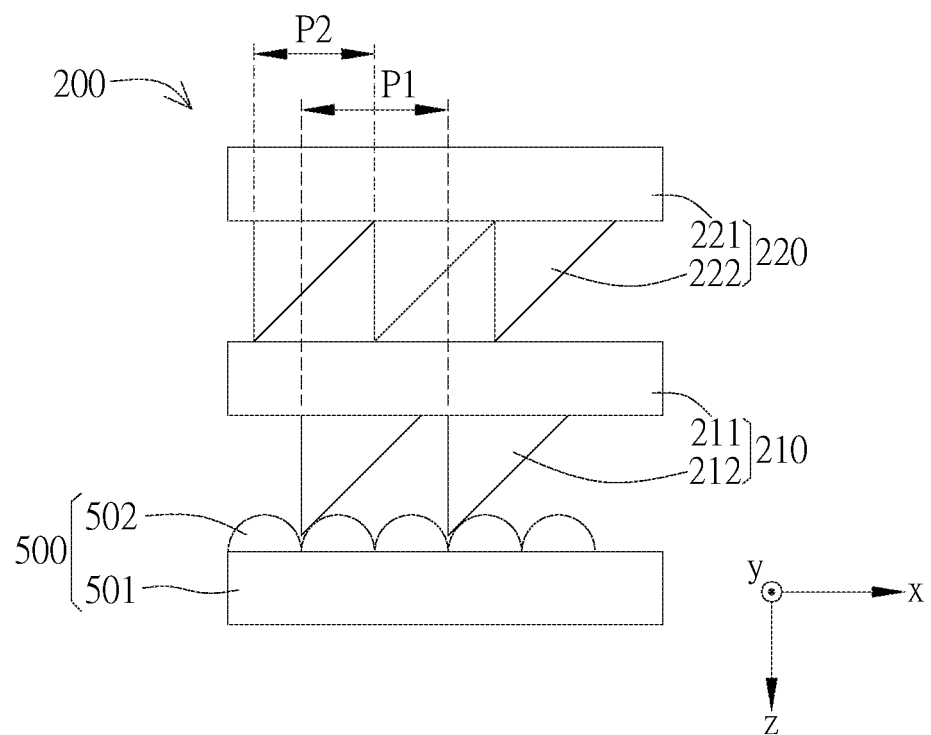
FIG. 10 is a schematic diagram of another embodiment of the rear light transmitting module in combination with the light collecting module.

FIG. 10 is a schematic diagram of another embodiment of the rear light transmitting module 200 in combination with the light collecting module 500. As shown in FIG. 10, the display device includes a first transmitting layer 210, a second transmitting layer 220, and a light collecting module 500. The light collecting module 500 includes a plurality of light collecting prisms 502 disposed on a base material 501. The light collecting prism 502 has a prism extension direction extending along a y direction in FIG. 10, and a cross section of the light collecting prism 502 may be a semicircle. As shown in FIG. 10, the first prism 212 and the second prism 222 are formed in a misalignment manner, each first prism 212 is disposed separately, and each second prism 222 is close to each other, where the first pitch P1 is greater than the second pitch P2. The first prism 212 matches the distribution of the light collecting prisms 502, so that at least a part of the first prisms 212 extend among the light collecting prisms 502. In this way, an entire thickness of the rear light transmitting module 200 may be further decreased.

The present invention has been described with reference to the above embodiments, but the above embodiments are merely examples for implementing the present invention. It should be noted that the disclosed embodiments are not intended to limit the scope of the present invention. On the contrary, any modification and equivalent configuration within the spirit and scope of the appended claims shall fall within the scope of the present invention.

What is claimed is:

1. A display device, comprising:
   a light source apparatus, having a first light emitting surface;
   a rear light transmitting module disposed opposite the first light emitting surface, wherein the rear light transmitting module includes:
      a first transmitting layer, having a plurality of first prisms arranged side by side and respectively protruding toward the first light emitting surface, wherein two sides of each first prism respectively have a first gentle surface and a first steep surface arranged along an extension direction of the first prisms, and the first steep surface is closer to upright than the first gentle surface relative to the first light emitting surface; and
      a second transmitting layer, overlapped with the first transmitting layer on one side thereof opposite the first light emitting surface, wherein the second transmitting layer has a plurality of second prisms arranged side by side and protruding toward the first transmitting layer, in which two sides of each second prism respectively have a second gentle surface and a second steep surface arranged along an extension direction of the second prisms, and wherein the second steep surface is closer to upright than the second gentle surface relative to the first light emitting surface; and
   a display panel disposed on one side of the light source apparatus opposite the rear light transmitting module, the light source apparatus having a second light emitting surface opposite the first light emitting surface and facing the display panel,
   wherein a vertical projection range of the first prisms on the first light emitting surface is misaligned with a vertical projection range of the second prisms on the first light emitting surface.

2. The display device according to claim 1, wherein the first gentle surface intersects the first steep surface to form a first ridge of the first prism, and the second gentle surface intersects the second steep surface to form a second ridge of the second prism, and wherein a vertical projection of the first ridge on the first light emitting surface and a vertical projection of the second ridge on the first light emitting surface are side by side at intervals.

3. The display device according to claim 2, wherein a gap is provided between the vertical projection of the first ridge on the first light emitting surface and the vertical projection of the second ridge on the first light emitting surface, and the gap ranges from 40% to 60% of a cross-sectional width of the first prism.

4. The display device according to claim 1, wherein the first gentle surface has a first vertical projection range on the first light emitting surface, the second gentle surface has a second vertical projection range on the first light emitting surface, and an area overlapped by the first vertical projection range and the second vertical projection range ranges from 40% to 60% of an area of the first vertical projection range.

5. The display device according to claim 1, wherein the first transmitting layer has a first base material, the first prisms respectively protruding toward the first light emitting surface from the first base material, and wherein the second transmitting layer has a second base material, the second prisms respectively protruding toward the first light emitting surface from the second base material, and a thickness of the first base material being less than or equal to a thickness of the second base material.

6. The display device according to claim 1, wherein a refractive index of the first prism is greater than or equal to a refractive index of the second prism.

7. The display device according to claim 6, wherein the second transmitting layer has a second base material, the second prisms respectively protruding toward the first light emitting surface from the second base material, and the refractive index of the second prism being greater than or equal to a refractive index of the second base material.

8. The display device according to claim 7, wherein the first transmitting layer has a first base material, the first prisms respectively protrude toward the first light emitting surface from the first base material, in which the refractive index of the first prism is greater than or equal to a refractive index of the first base material, and the refractive index of the first base material is less than or equal to the refractive index of the second prism.

9. The display device according to claim 1, wherein an included angle between the first steep surface or the second steep surface and the first light emitting surface ranges from 85 degrees to 95 degrees.

10. The display device according to claim 1, wherein an included angle between the first gentle surface or the second gentle surface and the first light emitting surface ranges from 30 degrees to 60 degrees.

11. The display device according to claim 1, further comprising a light collecting module disposed between the first light emitting surface and the first transmitting layer, wherein the light collecting module includes a plurality of light collecting prisms respectively protruding toward the first transmitting layer.

12. The display device according to claim 11, wherein at least part of the first prisms extend among the light collecting prisms.

13. The display device according to claim 1, wherein a first pitch is provided between every two adjacent first prisms, and a second pitch is provided between every two adjacent second prisms, a ratio of the first pitch to the second pitch ranging from 1/20 to 20.

14. The display device according to claim 1, further comprising a housing, wherein the display panel, the light source apparatus, and the rear light transmitting module are accommodated in the housing, the housing having a display window and a light inlet window disposed at opposite sides thereof, the display window corresponding to the display panel, and the light inlet window corresponding to the rear light transmitting module.

* * * * *